United States Patent [19]

Yoshioka et al.

[11] Patent Number: 5,194,770
[45] Date of Patent: Mar. 16, 1993

[54] VEHICULAR A.C. GENERATOR

[75] Inventors: Nobuatsu Yoshioka; Keiichi Komurasaki, both of Hyogo, Japan

[73] Assignee: Mitsubishi Denki K.K., Tokyo, Japan

[21] Appl. No.: 757,407

[22] Filed: Sep. 10, 1991

[30] Foreign Application Priority Data

Sep. 28, 1990 [JP] Japan .................. 2-261280
Sep. 28, 1990 [JP] Japan .................. 2-261281

[51] Int. Cl.$^5$ .................. H02K 5/24; H02K 9/00; H02K 9.06
[52] U.S. Cl. .................. 310/51; 310/58; 310/62
[58] Field of Search .................. 310/52, 60 R, 60 A, 310/58, 59, 51, 62, 63, 68 D; 181/202

[56] References Cited

U.S. PATENT DOCUMENTS

| 4,132,912 | 1/1979 | Wright | 310/62 |
| 4,184,804 | 1/1980 | Inagaki et al. | 310/62 |
| 4,464,594 | 8/1984 | Matsumoto et al. | 310/63 |
| 4,488,070 | 12/1984 | Iwaki et al. | 310/62 |
| 4,659,950 | 4/1987 | Gotoh | 310/59 |
| 5,021,696 | 6/1991 | Nelson | 310/62 |
| 5,028,826 | 7/1991 | Kitamura | 310/62 |

FOREIGN PATENT DOCUMENTS

| 0401034 | 12/1990 | European Pat. Off. |   |
| 0418027A1 | 3/1991 | European Pat. Off. |   |
| 3211502 | 11/1982 | Fed. Rep. of Germany |   |
| 3314948 | 11/1983 | Fed. Rep. of Germany |   |
| 8913392 | 2/1990 | Fed. Rep. of Germany |   |
| 0160952 | 12/1980 | Japan | 310/63 |
| 0031350 | 3/1981 | Japan | 310/62 |

Primary Examiner—Steven L. Stephan
Assistant Examiner—C. LaBalle
Attorney, Agent, or Firm—Sughrue Mion Zinn Macpeak & Seas

[57] ABSTRACT

A vehicular a.c. generator comprising a stator coupled to a pair of brackets on either side, a rotor secured to a rotary shaft supported with both brackets via respective bearings, and a pair of fans fitted to the core portions on either side of the rotor, wherein each bracket has a plurality of suction ports at one end and a plurality of exhaust ports in the outer peripheral portion thereof, wherein the inner edge face of one bracket axially faces vanes of the fan with a small clearance therebetween and wherein the generator is ventilated and cooled by the fans as the rotor rotates, is characterized in that a gently-sloping annular depression is provided in the inner edge face of the one bracket facing the vanes of the fan, the depression being made in a clearance that axially grows larger from the axial center of the suction part toward both the external radial positions thereof.

4 Claims, 6 Drawing Sheets

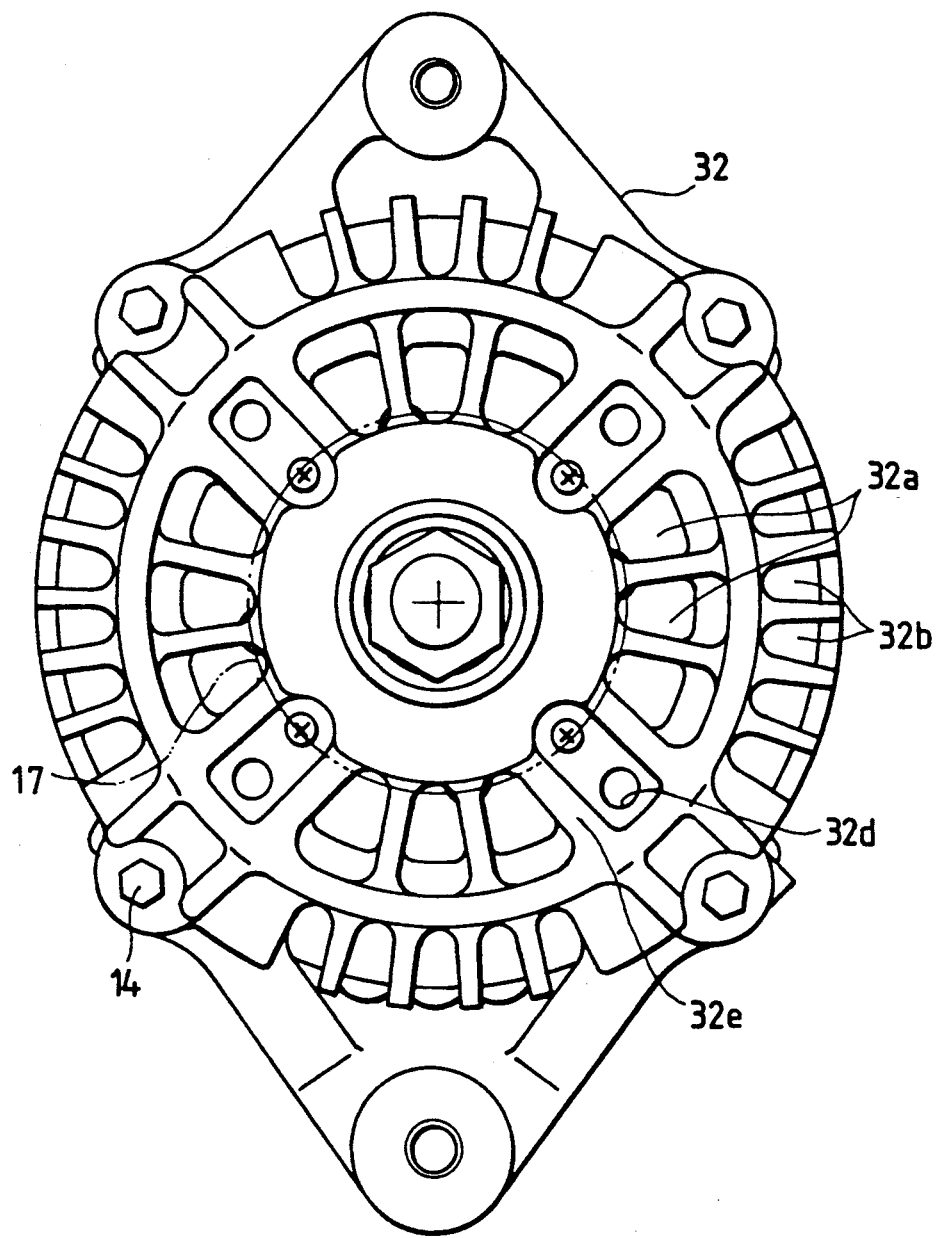

VEHICULAR A.C. GENERATOR

BACKGROUND OF THE INVENTION

1. Field of the Invention

The present invention relates to a vehicular a.c. generator having fans fitted to a bracket support type rotor and used for ventilating and cooling the generator and more particularly to a generator construction capable of suppressing the suction air noise caused by the fan.

2. Prior Art

FIGS. 1 and 3 are a sectional elevational and a side view of a conventional vehicular a.c. generator. As shown in these figures, the a.c. generator comprises a stator 1 formed of a stator core 2 and a stator coil 3, a rotor 4 formed of heteropolar magnetic pole cores 5, 6, the magnetic tooth portions of both being alternately projected in the circumferential direction, an exciting coil 7 held between the pole cores 5, 6, a rotary shaft 8 for securing the pole cores 5, 6, a pair of slip rings 9 held by the rotary shaft 8 via insulating sleeves, and fans 10, 11 respectively held by the pole cores 5, 6.

The generator further includes a front and a rear bracket 12, 13 for fixing the stator core 2 by means of clamping bolts 14. The front bracket 12 is provided with suction ports 12a for ventilation at one end and exhaust ports 12b in the outer peripheral portion thereof. Reference character m designates an external radius from the axial center of the suction port 12a. Moreover, the rear bracket 13 is provided with suction ports 13a at one end and exhaust ports 13b in the outer peripheral portion thereof. The rotary shaft 8 is support with the front and the rear bracket 12, 13 via respective bearings 15, 16. A pulley 17 is fitted to the rotary shaft 8 and used for transmitting engine torque to the rotary shaft 8 in order to rotate the rotor 4.

The generator further includes a rectifier 18 for converting a.c. current resulting from the a.c. voltage induced in the stator coil 3 to d.c. current, a heat sink 18a being used to radiate the heat of the rectifier, a voltage regulator 19 for detecting the generator voltage, controlling exciting current and adjusting terminal voltage to a predetermined value, a heat sink 19a being used to radiate the heat of the voltage regulator, and a brush holder 20 for urging brushes 28 held therein onto respective slip rings 9, the brush holding also performing a current collecting function.

As the rotor 4 in the a.c. generator described above rotates, the a.c. voltage is induced in the stator coil 3 and the power thus supplied causes it to generate heat. The stator unit 1 and the rotor unit 4 are ventilated and cooled by the rotating fans 10, 11.

The cooling air produced by the rotation of the fan 10 is sucked through the suction ports 12a of the front bracket 12 and discharged from the exhaust ports 12b as shown by an arrow A. The cooling air produced by the rotation of the fan 11 is sucked through the suction ports 13a of the rear bracket 13 and before being discharged from the exhaust ports 13b as shown by an arrow B, used for cooling the rectifier 18, the voltage regulator 19, the current collector unit and the stator unit 1.

FIG. 2 is an expanded view of a portion D of FIG. 1. The inner edge face of the front bracket 12 axially faces the vane 10a of the fan 10 in parallel with a small clearance g therebetween. The outside atmosphere is induced into the clearance g and flows therethrough as shown by an arrow C. If the clearance g is too large, the air to be discharged is caused to flow reversely and therefore it is inexpedient. The position of the external radius m from the axial center of the suction port 12a substantially corresponds to the center position of the radial length l of the vane 10a.

In the conventional vehicular a.c. generator described above, the clearance g between the vane 10a of the fan 10 and the inner edge face of the front bracket facing it is small and consequently ventilation resistance in the suction part in the external radial portion of the suction port 12a tends to become high. This causes noise offensive to the ears and constitutes a primary factor in raising an overall sound pressure level.

Further, in the conventional vehicular a.c. generator described above, vanes 10a of the fan 10 cross a circumferential portion where each of them and the suction part 12a overlap. Consequently, a collective frequency resulting from multiplying the rotating frequency by the number of vanes 10a and a frequency resulting from multiplying the rotating frequency by the number of suction ports 12a; that is, in the case of suction ports 12a in FIG. 4, the sound pressure due to the ventilating noise component of the 12-fold frequency of the suction port 12a tends to become conspicuous and offensive to the ears. In addition, this problem constitutes a primary factor in raising an overall sound pressure level.

SUMMARY OF THE INVENTION

An object of the present invention is to solve the foregoing problems by providing a vehicular a.c. generator which is designed to lower an overall ventilating sound level in a clearance where the inner edge face of one bracket axially faces vanes of a fan and therefore to suppress noise offensive to the ears.

Another object of the present invention is to solve the foregoing problems by providing a vehicular a.c. generator which is designed to lower the sound pressure level of suction air current from each suction port at one end of a bracket axially facing vanes of a fan as the fan rotates and therefore to suppress noise offensive to the ears.

A vehicular a.c. generator according to the present invention has an annular depression so that an axial clearance in the inner edge face of one bracket axially facing vanes of a fan is large in the external radial portion of a suction port and becomes gradually small on both sides thereof.

Further, a vehicular a.c. generator according to the present invention has suction holes in a plurality of ribs widened in the circumferential direction at one end of a bracket axially facing vanes of a fan, so that the ventilating air produced by the fan is sucked through the suction holes in addition to a plurality of suction ports.

According to the present invention, as the clearance in the form of the annular depression in the inner edge face of the bracket axially facing the vane of the fan is large in the external radial position of the suction port, the ventilation resistance of the suction air from the suction port is reduced and the wind pressure caused by the wind flow is decreased. As a result, an overall sound pressure level is reduced and ventilating noise is also decreased.

Further, according to the present invention, the ventilating air produced by the fan is sucked through the suction holes bored in the ribs in addition to the suction ports of the bracket. The frequency resulting from multiplying the rotating frequency by the number of suction ports is dispersed and the frequency thus reduced lowers the sound pressure level. Moreover, the suction part of the bracket is continuously formed without being discontinued by the ribs widened in the circumferential direction. As a result, the suction air current is made uniform and the overall value is generally reduced.

BRIEF DESCRIPTION OF THE DRAWINGS

FIGS. 8 and 9 are a sectional and a side view of the first half portion of a vehicular a.c. generator embodying the present invention.

DETAILED DESCRIPTION OF THE PREFERRED EMBODIMENTS

Figure 4:
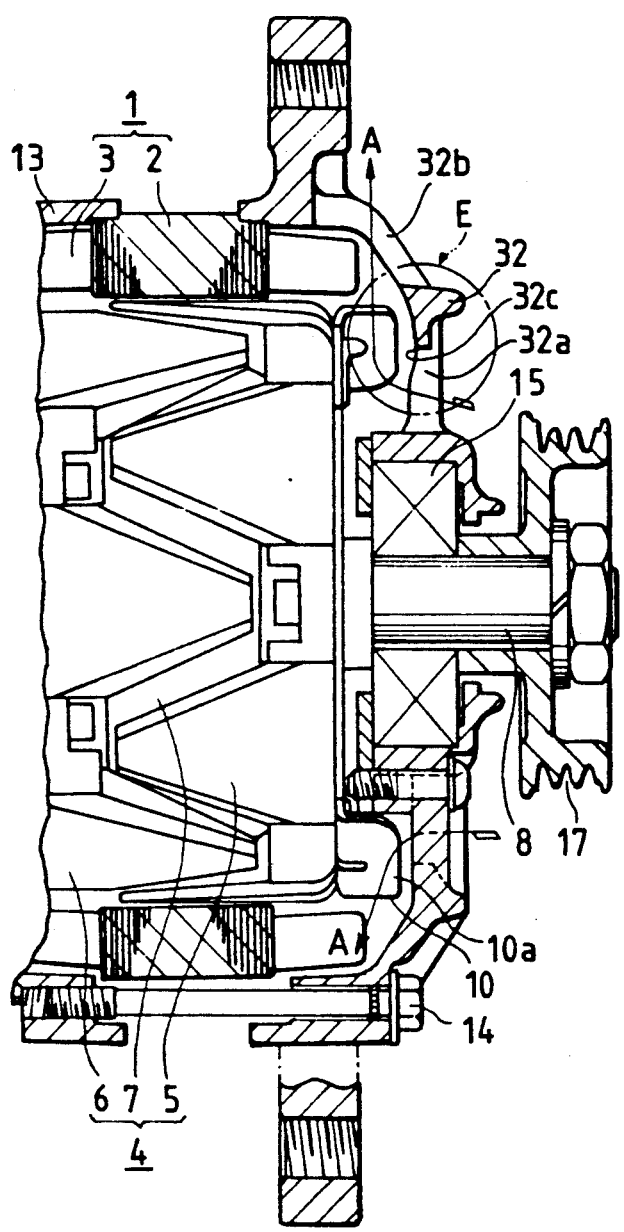
FIGS. 4 and 7 are a sectional and a side view of the first half portion of a vehicular a.c. generator embodying the present invention.
Figure 7:
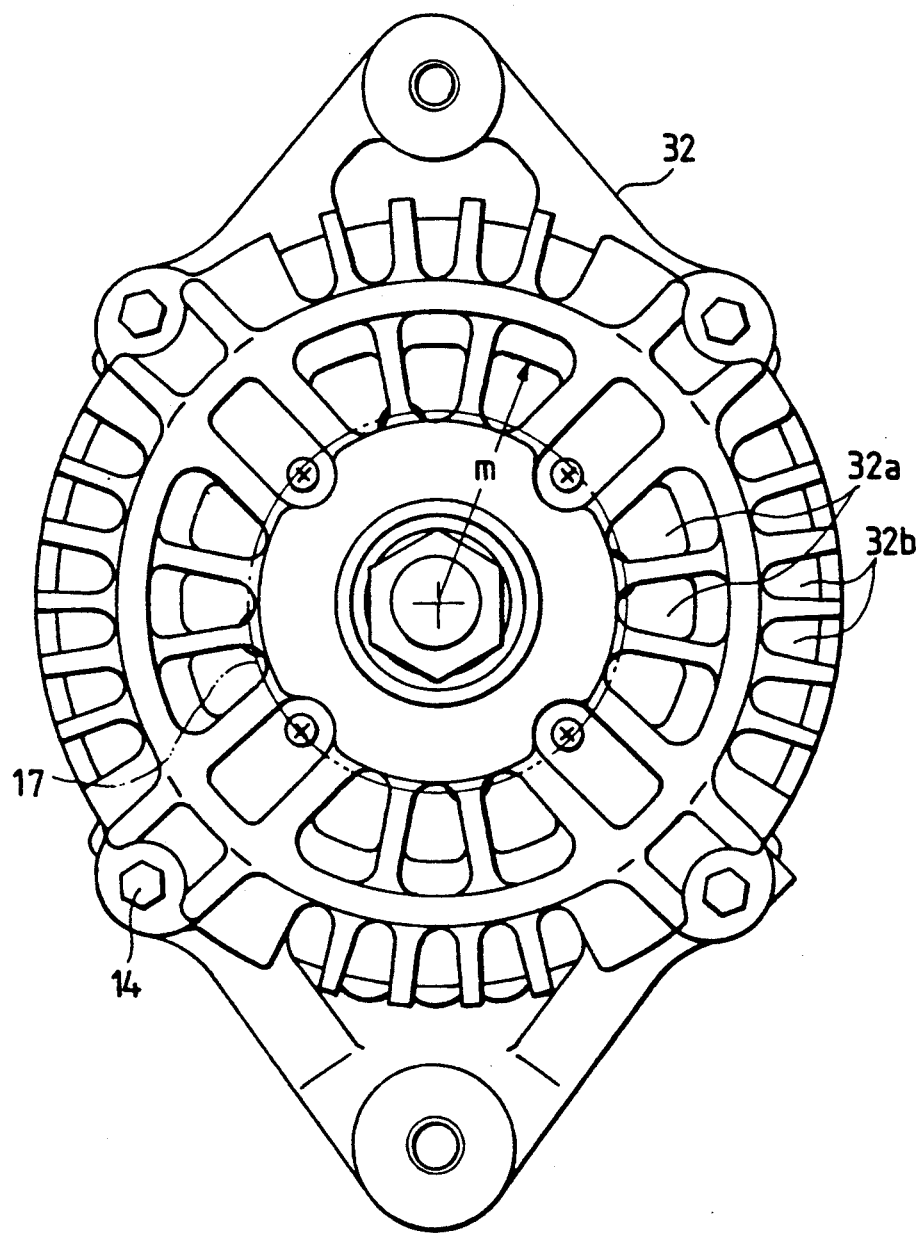

FIGS. 4 and 7 are a sectional and a side view of the first half portion of a vehicular a.c. generator embodying the present invention. Reference characters 1–8, 10, 10a, 13–15, 17, and its second half portion of which illustration has been omitted designate parts and a portion corresponding to those indicated with reference to the conventional generator described above. As shown in FIGS. 4 and 7, a front bracket 32 has a plurality of suction ports 32a at one end and a plurality of exhaust ports 32b in the outer peripheral portion thereof. The position of the external radius m of the suction port 12a of the front bracket 32 substantially corresponds to the center position of the radial length l of the vane of the fan 10 (see FIG. 5).

Figure 5:
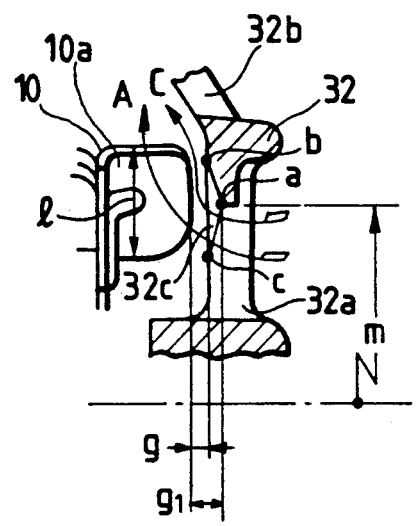
FIG. 5 is an expanded view of a portion E of FIG. 4.

FIG. 5 is an expanded view of a portion E of FIG. 4. A small clearance g is provided in the inner edge face of the front bracket 32 axially facing the vane 10a of the fan 10 and on the suction and exhaust side thereof with respect to the vane 10a. A larger clearance g1 is provided in the external radial m position of the suction port 32a. A triangular annular depression 32c is thus provided. The radial position of the apex a of the triangle is positioned at the external radius m of the suction port 32a and the length bc of the base of the triangle is arranged so that it becomes bc≧1 with respect to the length of the vane 10a.

Figure 1:
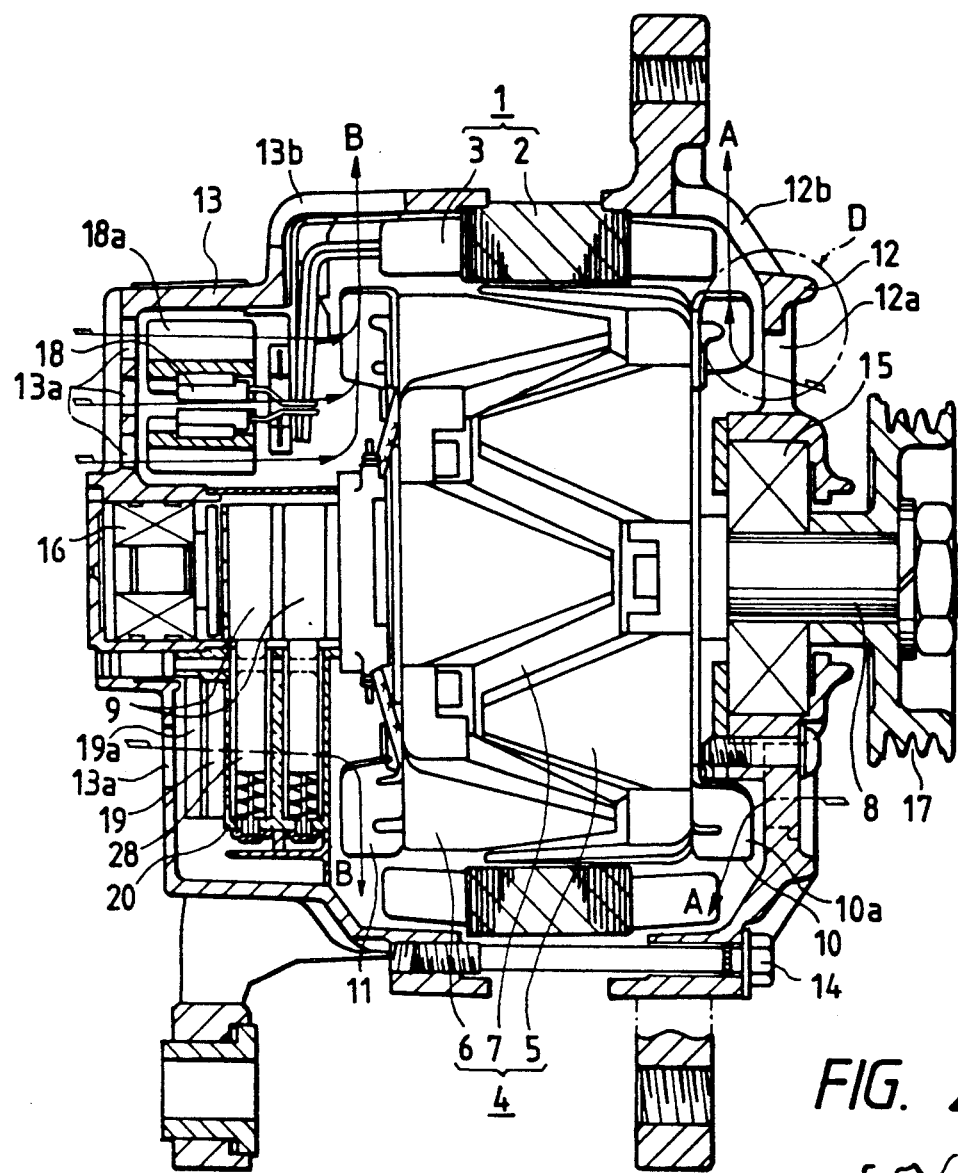
FIGS. 1 and 3 are a sectional elevational and a side view of a conventional vehicular a.c. generator.

As set forth above, the clearance g1 at the apex of the depression 32c relative to the vane 10a is made greater than what exists between the vane 10a and the opposite face of the suction port 12a in the conventional example of FIG. 1. The ventilation resistance in the suction part is thus decreased. As a result, the wind pressure due to the ventilation shown by an arrow C is made lower than before and therefore an overall sound pressure level can be reduced.

Figure 6:
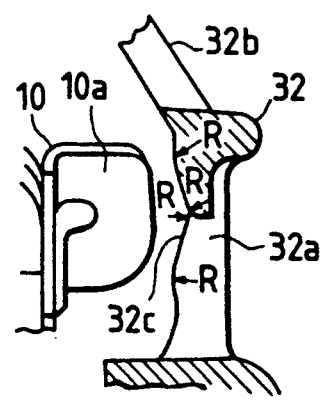
FIG. 6 is a sectional view of another embodiment of the present invention as what corresponds to FIG. 5.

FIG. 6 is a sectional view of another embodiment of the present invention as what corresponds to FIG. 5. The annular depression 32c in the inner edge face of the front bracket 32 and each corner of the suction port 32a are formed in an arcuate profile, whereby the overall value is decreased further.

Although the annular depression in the inner edge face of the front bracket 32 facing the vane of the fan is made triangular in the embodiments shown, it may be a split circle in profile.

Figure 8:
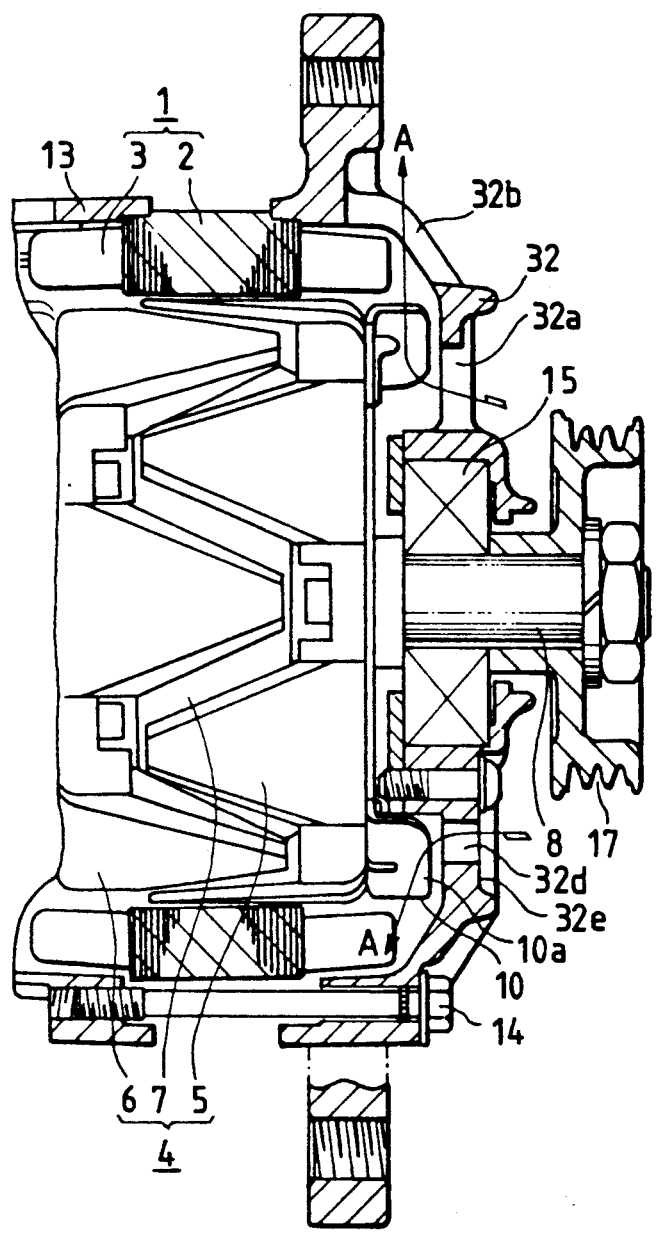

FIG. 8 is a sectional view of the first half portion of a vehicular a.c. generator according to another embodiment of the present invention. Reference characters 1–8, 10, 10a, 13–15, 17, and its second half portion of which illustration has been omitted designate parts and a portion corresponding to those indicated with reference to the conventional generator described above.

FIG. 9 is a side view of FIG. 8.

As shown in FIGS. 8 and 9, a front bracket 32 has a plurality of suction ports 32a at one end and a plurality of exhaust ports 32b in the outer peripheral portion thereof. Moreover, there is provided a suction hole 32d between two groups of suction ports 32a, each group having three of them.

When the fan 10 is rotated by the rotor 4 in the generator embodying the present invention, cooling air is sucked through each of the suction ports 32a and the suction hole 32d and circulated as shown by the arrow A.

Figure 2:
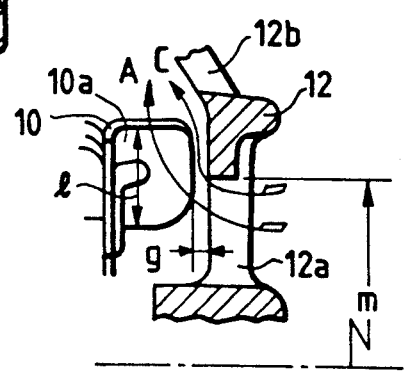
FIG. 2 is an expanded view of a portion D of FIG. 5.
Figure 3:
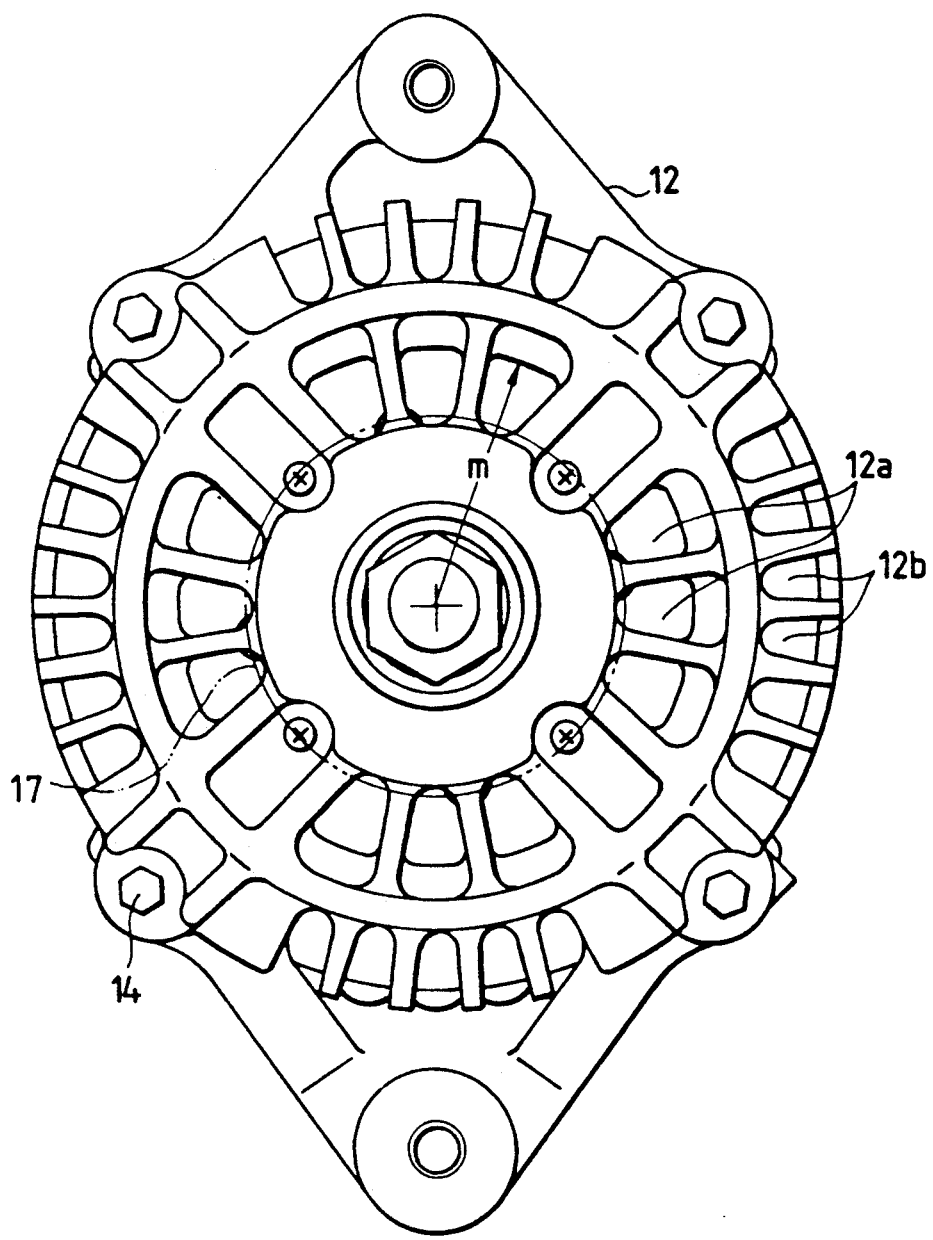

A frequency resulting from multiplying the rotating frequency by the number of suction ports 32a; that is, in the case of what is shown in FIG. 2, the 12-fold frequency is dispersed, whereby the 12-fold frequency is reduced. With the suction holes 32d, moreover, the suction part of the front bracket 32 is prevented from being discontinued by ribs 32c and continuously formable and the suction air current is made uniform. Consequently, not only the overall value in general but also the sound pressure level of the 12-fold frequency becomes reducible.

Although the round hole 32d has been provided in each rib 32c, it may be different in shape.

As set forth above, according to the present invention, the gently-sloping annular depression is provided in the inner edge face of the bracket axially facing the vane of the fan with a small clearance therebetween, whereas the depression is provided with an axially large clearance in the external radial positions of the suction port in order that part of the suction air from the suction port of the bracket is allowed to pass through the large clearance. Consequently, the ventilating noise is suppressed with the effect of nullifying a feeling of discomfort.

Further, as set forth above, according to the present invention, the suction hole is provided in each widened rib between the groups of suction ports in the circumferential direction at one end of the bracket axially facing the fan. Consequently, the overall value of the sound pressure level of the ventilating air noise is reduced. Moreover, the sound pressure level of the frequency resulting from multiplying the rotating frequency by the number of suction ports is lowered, so that noise physiologically offensive to the ears becomes suppresible.

What is claimed is:

1. A vehicular a.c. generator, comprising:
   a stator coupled to a pair of brackets;
   a rotor secured to a rotary shaft supported with said brackets via respective bearings, said rotor having core portions;
   a pair of fans fitted to said core portions on both sides of said rotor, wherein each bracket has a plurality of suction ports at one end and a plurality of exhaust ports in the outer peripheral portion thereof, wherein the inner edge face of one bracket axially faces vanes of said fan with a small clearance therebetween and wherein said generator is ventilated and cooled by said fans as said rotor rotates, wherein a gently-sloping annular depression is provided in the inner edge face of said one bracket axially facing the vanes of said fan at a position defined by a radial distance from the center of said one bracket through said suction port to the outer portion of said suction port which is perpendicular to a line representing said radial distance, said depression forming a clearance that gradually becomes larger from the center of said suction port toward said outer portion of said suction port.

2. A vehicular a.c. generator as claimed in claim 1, wherein said gently-sloping annular depression is formed in an arcuate profile.

3. A vehicular a.c. generator as claimed in claim 1, wherein said gently-sloping annular depression is in the form of a triangle.

4. A vehicular a.c. generator as claimed in claim 1, wherein said gently-sloping annular depression is in the form of a split circle.

* * * * *